United States Patent
Sumi

(10) Patent No.: US 12,348,095 B2
(45) Date of Patent: Jul. 1, 2025

(54) COIL WITH CONTOUR SHAPE, STATOR, AND MOTOR HAVING SAME

(71) Applicant: Nidec Corporation, Kyoto (JP)

(72) Inventor: Shigeharu Sumi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 222 days.

(21) Appl. No.: 17/791,936

(22) PCT Filed: Oct. 16, 2020

(86) PCT No.: PCT/JP2020/039028
§ 371 (c)(1),
(2) Date: Jul. 11, 2022

(87) PCT Pub. No.: WO2021/145037
PCT Pub. Date: Jul. 22, 2021

(65) Prior Publication Data
US 2023/0045439 A1 Feb. 9, 2023

(30) Foreign Application Priority Data

Jan. 17, 2020 (JP) .................................. 2020-005868

(51) Int. Cl.
*H02K 3/04* (2006.01)
*H02K 1/16* (2006.01)
*H02K 15/04* (2025.01)

(52) U.S. Cl.
CPC ................. *H02K 3/04* (2013.01); *H02K 1/16* (2013.01); *H02K 15/04* (2013.01)

(58) Field of Classification Search
CPC ............ H02K 3/04; H02K 1/16; H02K 15/04; H02K 15/045; H02K 3/18; H02K 3/28; H02K 3/12

USPC ......................................................... 310/208
See application file for complete search history.

(56) References Cited

U.S. PATENT DOCUMENTS

2020/0144900 A1    5/2020   Sumi

FOREIGN PATENT DOCUMENTS

| JP | 2001178051 A | * | 6/2001 |
| JP | 2004072824 A | * | 3/2004 |
| JP | 2004-180396 A |  | 6/2004 |
| JP | 2005-310566 A |  | 11/2005 |

(Continued)

OTHER PUBLICATIONS

Machine Translation of Kamo, JP 200407284 A (Year: 2004).*

(Continued)

*Primary Examiner* — Alexander A Singh
*Assistant Examiner* — Charlie Frank Mann, Jr.
(74) *Attorney, Agent, or Firm* — Keating & Bennett, LLP

(57) ABSTRACT

A coil attachable to a tooth extending to one radial side of the tooth from an annular core back surrounding a central axis of a motor includes a first winding body including a first wound flat wire, and a second winding body including a second wound flat wire, that is located on a radial side of the first winding body, and that is connected to the first winding body. When N is a freely-selected integer of 1 or more, and M is a freely-selected integer larger than N, the first winding body is an N-layer winding body aligned and wound in two rows aligned in a radial direction, and the second winding body is an M-layer winding body aligned and wound in two rows aligned in the radial direction.

9 Claims, 6 Drawing Sheets

(56) References Cited

FOREIGN PATENT DOCUMENTS

| JP | 2006-191757 A | 7/2006 |
| JP | 2007135329 A | 5/2007 |
| WO | 2019064712 A1 | 4/2019 |

OTHER PUBLICATIONS

Machine Translation of JP_2004072824_A (Year: 2004).*
Machine Translation of JP_2001178051_A (Year: 2001).*
Official Communication issued in International Patent Application No. PCT/JP2020/039028, mailed on Dec. 8, 2020.
Official Communication issued in corresponding Chinese Patent Application No. 202080093023.5, mailed on Oct. 28, 2024, 7 pages.

* cited by examiner

COIL WITH CONTOUR SHAPE, STATOR, AND MOTOR HAVING SAME

CROSS-REFERENCE TO RELATED APPLICATIONS

This is a U.S. national stage of application No. PCT/JP2020/039028, filed on Oct. 16, 2020, and with priority under 35 U.S.C. § 119(a) and 35 U.S.C. § 365(b) being claimed from Japanese Patent Application No. 2020-005868, filed on Jan. 17, 2020, the entire contents of which are hereby incorporated herein by reference.

1. FIELD OF THE INVENTION

The present disclosure relates to a coil, a motor, and a method of manufacturing the coil.

2. BACKGROUND

A coil configured by winding a flat wire is known. For example, a coil in which a cross-sectional shape of a winding is a trapezoidal shape is known.

In a case where a multilayer coil is formed by winding flat wires, it may be difficult to align the flat wires with high accuracy. Therefore, the shape of the coil may be distorted.

SUMMARY

A coil according to an example embodiment of the present disclosure is a coil which is attachable to a tooth extending to one radial side of the tooth from an annular core back surrounding a central axis of a motor. The coil includes a first winding body including a first wound flat wire and a second winding body including a second wound flat wire, that is located on a radial side of the first winding body, and that is connected to the first winding body. When N is a freely-selected integer of 1 or more, and M is a freely-selected integer larger than N, the first winding body is an N-layer winding body aligned and wound in two rows aligned in a radial direction, and the second winding body is an M-layer winding body aligned and wound in two rows aligned in the radial direction.

A motor according to an example embodiment of the present disclosure includes a rotor that is rotatable about a central axis and a stator that opposes the rotor in a radial direction with a gap interposed therebetween. The stator includes an annular core back that surrounds the central axis, a tooth that extends from the core back to one radial side, and the above-described coil attached to the tooth.

A method according to an example embodiment of the present disclosure is a method of manufacturing a coil which is attached to a tooth extending to one radial side from an annular core back surrounding a central axis of a motor. The method includes winding a flat wire to form a first winding body, winding another flat wire to form a second winding body, and arranging the second winding body on a radial side of the first winding body and connecting the first winding body and the second winding body. When N is a freely-selected integer of 1 or more, and M is a freely-selected integer larger than N, the first winding body is an N-layer winding body aligned and wound in two rows aligned in a radial direction, and the second winding body is an M-layer winding body aligned and wound in two rows aligned in the radial direction.

The above and other elements, features, steps, characteristics and advantages of the present disclosure will become more apparent from the following detailed description of the example embodiments with reference to the attached drawings.

DETAILED DESCRIPTION

A Z-axis direction appropriately illustrated in each drawing is a vertical direction in which a positive side is an "upper side" and a negative side is a "lower side". A central axis J appropriately illustrated in each drawing is a virtual line that is parallel to the Z-axis direction and extends in the vertical direction. In the following description, an axial direction of the central axis J, that is, a direction parallel to the vertical direction, is simply referred to as "axial direction", a radial direction around the central axis J is simply referred to as "radial direction", and a circumferential direction around the central axis J is simply referred to as "circumferential direction". Further, in the example embodiments, a radially inner side corresponds to one radial side, and a radially outer side corresponds to another radial side.

The vertical direction, the upper side, and the lower side are merely terms for describing a relative positional relationship between the respective units, and an actual layout relationship and the like may be other than the layout relationship represented by these terms.

Figure 1:
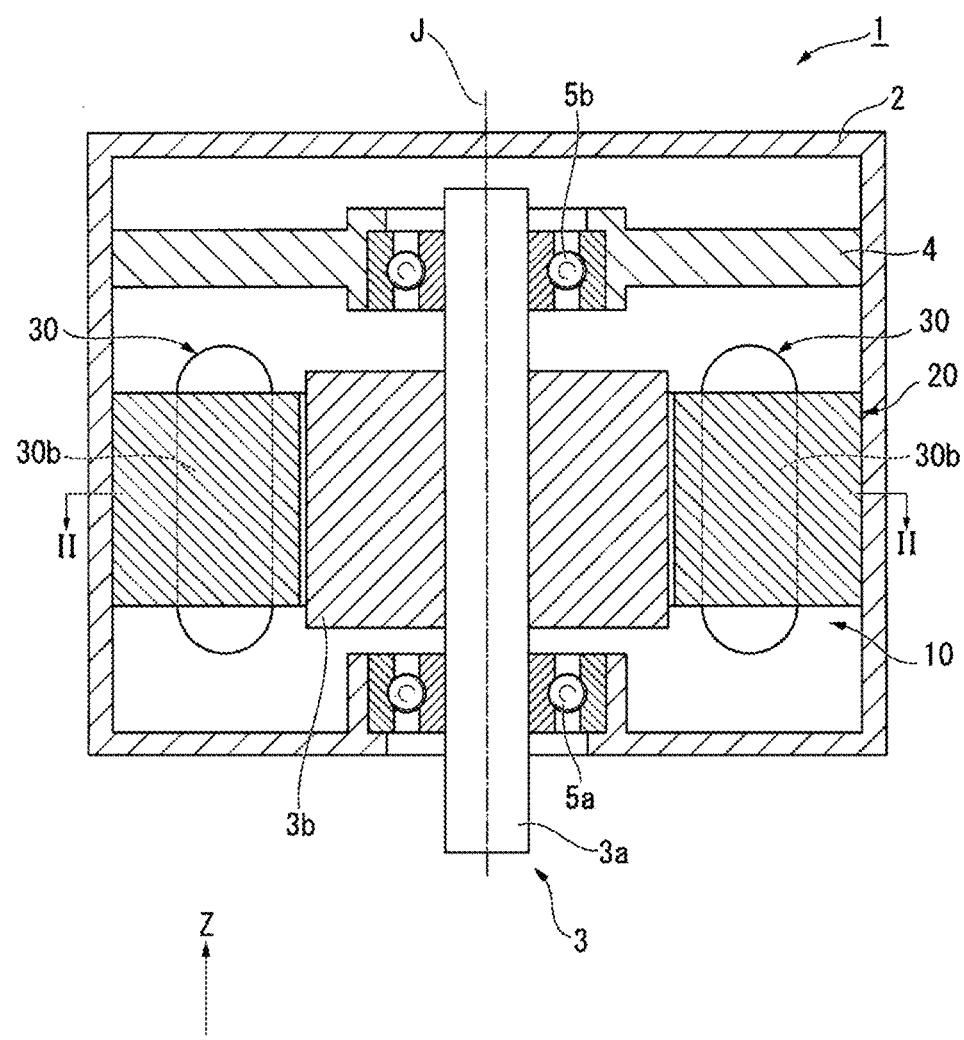
FIG. 1 is a cross-sectional view schematically illustrating a motor of a first example embodiment of the present disclosure.

As illustrated in FIG. 1, a motor 1 of the present example embodiment is an inner rotor type motor. The central axis of the motor 1 is the central axis J. The motor 1 includes a housing 2, a rotor 3, a stator 10, a bearing holder 4, and bearings 5a and 5b. The housing 2 accommodates the rotor 3, the stator 10, the bearing holder 4, and the bearings 5a and 5b. The rotor 3 is rotatable about the central axis J. The rotor 3 includes a shaft 3a and a rotor main body 3b.

The shaft 3a extends in the axial direction along the central axis J. The shaft 3a has, for example, a columnar shape that is centered on the central axis J and extends in the axial direction. The shaft 3a is supported by the bearings 5a and 5b to be rotatable about the central axis J. The rotor main body 3b is fixed to an outer peripheral surface of the shaft 3a. Although not illustrated, the rotor main body 3b includes a rotor core fixed to the outer peripheral surface of the shaft 3a and a magnet fixed to the rotor core. The bearing holder 4 holds the bearing 5b.

Figure 2:
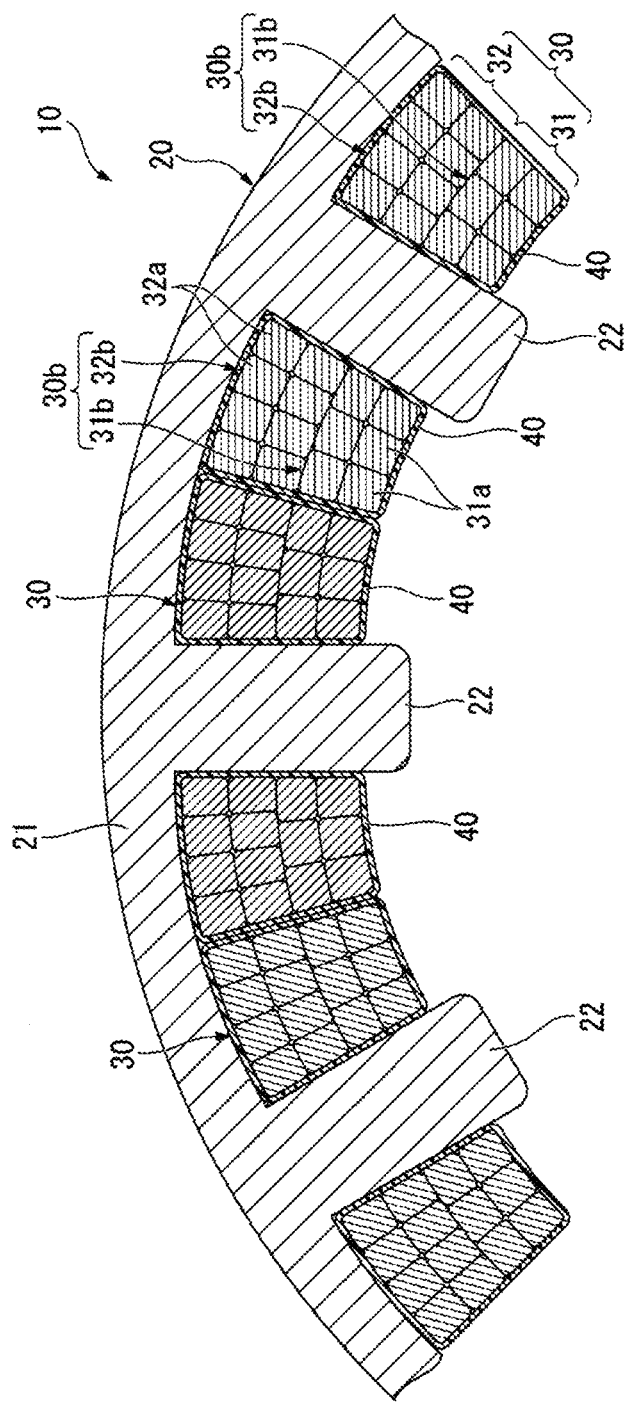
FIG. 2 is a cross-sectional view illustrating a portion of a stator of the first example embodiment and is a cross-sectional view taken along line II-II in FIG. 1.

The stator 10 faces the rotor 3 in the radial direction with a gap interposed therebetween. In the present example embodiment, the stator 10 is located on the radially outer side of the rotor 3. As illustrated in FIG. 2, the stator 10 includes a stator core 20, a plurality of coils 30, and an insulator 40. The stator core 20 includes an annular core back 21 surrounding the central axis J and a plurality of teeth 22 extending to a radially inner side from the core back 21. The core back 21 has, for example, a cylindrical shape centered on the central axis J.

The plurality of teeth 22 are arranged at intervals along the circumferential direction. The plurality of teeth 22 are arranged at equal intervals over the entire circumference along the circumferential direction, for example. In the present example embodiment, the plurality of teeth 22 are formed integrally with the core back 21. Each of the teeth 22 has a substantially rectangular parallelepiped shape extending linearly along the radial direction. The circumferential dimension of the tooth 22 is substantially constant over the entire radial direction.

Note that the radially inner end portion of the tooth 22 may be provided with umbrella portions protruding to both circumferential sides. In addition, the tooth 22 may be a member separate from the core back 21. In this case, the tooth 22 may be fixed to the core back 21, for example, by press-fitting a protrusion provided at end portions on the radially outer side of the tooth 22 into a concave portion provided on the radially inner surface of the core back 21.

The plurality of coils 30 are attached to the plurality of teeth 22, respectively. In the present example embodiment, the coil 30 is attached to the tooth 22 via the insulator 40. Each tooth 22 passes through the inside of each coil 30 in the radial direction. The radially inner end portion of the tooth 22 protrudes to the radially inner side from the coil 30.

The coil 30 is configured by winding a flat wire. Therefore, the space factor of the coil 30 can be improved as compared with the case of using a round wire. In the present specification, the "flat wire" is a wire rod of which a cross-sectional shape is a quadrangular shape or a substantially quadrangular shape. In the present specification, the term "substantially quadrangular shape" includes a rounded quadrangular shape in which the corners of a quadrangular shape are rounded. Although not illustrated, the flat wire configuring the coil 30 in the present example embodiment is an enameled wire having an enamel coating on the surface.

The coil 30 includes a pair of axially extending portions 30b extending in the axial direction on both circumferential sides of the tooth 22 to which the coil 30 is attached. The tooth 22 is interposed between the pair of axially extending portions 30b in the circumferential direction. The axially extending portion 30b is configured by bundling a plurality of flat wires configuring the coil 30. The contour shape of the axially extending portion 30b in the cross section orthogonal to the axial direction is, for example, a fan shape in which the circumferential dimension decreases toward the radially inner side.

The term "fan shape" as used herein involves a shape surrounded by two arcs that are equal in center of curvature to each other and are different in radius from each other, and two line segments extending in radius directions of circles with their centers aligned with the centers of curvature and respectively connecting to opposite ends of the two arcs. In addition, the term "fan shape" as used herein involves a strictly fan shape and a substantially fan shape. The term "substantially fan shape" as used herein involves a shape in which fan-shaped arcs are approximated by a plurality of line segments. In the present example embodiment, the contour shape of the axially extending portion 30b in the cross section orthogonal to the axial direction is a shape surrounded by the two arcs and the two line segments as described above. Although not illustrated, the center of curvature of the contour shape of the axially extending portion 30b in the cross section orthogonal to the axial direction is located on the radially inner side of the core back 21 and is located at a position different from the central axis J.

The coil 30 includes a first winding body 31 and a second winding body 32. Each of the first winding body 31 and the second winding body 32 is configured by winding a flat wire. In the present example embodiment, the first winding body 31 configures the radially inner portion of the coil 30. In the present example embodiment, the second winding body 32 configures the radially outer portion of the coil 30. That is, the second winding body 32 is located on the radially outer side of the first winding body 31.

Figure 3:
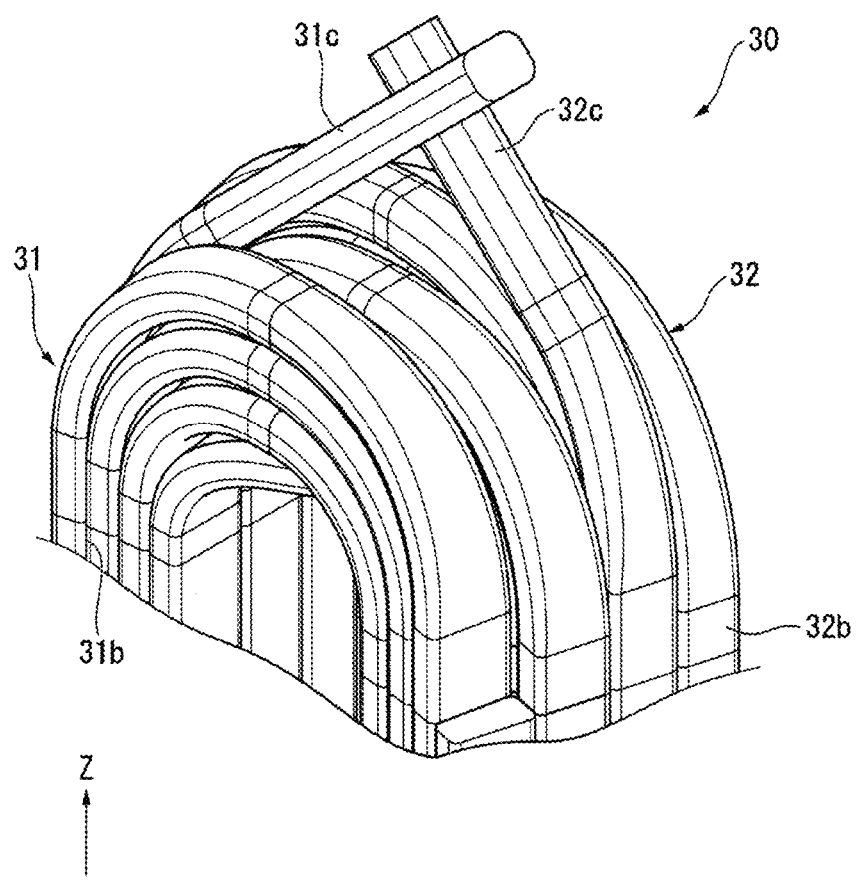
FIG. 3 is a perspective view illustrating a portion of the coil of the first example embodiment.

The second winding body 32 is connected to the first winding body 31. More specifically, as illustrated in FIG. 3, one end portion 31c of the flat wire configuring the first winding body 31 is connected to one end portion 32c of the flat wire configuring the second winding body 32. Accordingly, first winding body 31 and second winding body 32 are connected in series to configure one coil 30. A method of connecting the one end portion 31c and the one end portion 32c is not particularly limited. The one end portion 31c and the one end portion 32c may be fixed by solder, may be fixed by laser welding, or may be fixed by ultrasonic bonding. In addition, the one end portion 31c and the one end portion 32c may be provided with concave portions that mesh with each other.

In the following description, N is a freely-selected integer of 1 or more, and M is a freely-selected integer larger than N. At this time, the first winding body 31 is an N-layer winding body aligned and wound in two rows aligned in the radial direction. The second winding body 32 is an M-layer winding body aligned and wound in two rows aligned in the radial direction. As illustrated in FIG. 2, in the present example embodiment, the first winding body 31 is configured by stacking three layers of windings aligned and wound in two rows aligned in the radial direction. That is, in the present example embodiment, N is 3, and the first winding body 31 is a three-layer winding body aligned and wound in two rows aligned in the radial direction. Accordingly, the total number of windings of the first winding body 31 is six.

In the present example embodiment, the second winding body 32 is configured by stacking four layers of windings aligned and wound in two rows aligned in the radial direction. That is, in the present example embodiment, M is 4, and the second winding body 32 is a four-layer winding body aligned and wound in two rows aligned in the radial direction. Accordingly, the total number of windings of the second winding body 32 is eight. Therefore, the total number of windings of the coil 30 is fourteen.

The first winding body 31 includes a pair of first axially extending portions 31b extending in the axial direction on both circumferential sides of the tooth 22 to which the first winding body 31 is attached. The contour shape of the first axially extending portion 31b in the cross section orthogonal to the axial direction is, for example, a fan shape in which the circumferential dimension decreases toward the radially inner side. More specifically, the contour shape of the first axially extending portion 31b in the cross section orthogonal to the axial direction is a shape surrounded by two arcs and two line segments, similarly to the axially extending portion 30b described above.

In the present example embodiment, the cross-sectional shape of the portion configuring the first axially extending portion 31*b* among the flat wires configuring the first winding body 31 is a trapezoidal shape in which the circumferential dimension decreases toward the radially inner side. More specifically, the cross-sectional shape of the portion configuring the first axially extending portion 31*b* among the flat wires configuring the first winding body 31 is a rounded trapezoidal shape in which the circumferential dimension decreases toward the radially inner side. In the following description, a portion configuring the first axially extending portion 31*b* among the flat wires configuring the first winding body 31 is referred to as a first coil wire portion 31*a*.

Each of the pair of first axially extending portions 31*b* is configured by bundling a plurality of first coil wire portions 31*a*. In the present example embodiment, each of the first axially extending portions 31*b* is configured by bundling six first coil wire portions 31*a*. More specifically, in the present example embodiment, two rows of the first axially extending portions 31*b* are configured to be arranged in the radial direction, each row having three first coil wire portions 31*a* arranged in the circumferential direction. The circumferential dimension of the cross section of the first coil wire portion 31*a* configuring the radially outer row of the two rows aligned in the radial direction is larger than the circumferential dimension of the cross section of the first coil wire portion 31*a* configuring the radially inner row. The radial dimension of the cross section of the first coil wire portion 31*a* configuring the radially outer row is smaller than the radial dimension of the cross section of the first coil wire portion 31*a* configuring the radially inner row. The cross-sectional areas of the first coil wire portions 31*a* are the same.

The second winding body 32 includes a pair of second axially extending portions 32*b* extending in the axial direction on both circumferential sides of the tooth 22 to which the second winding body 32 is attached. The pair of second axially extending portions 32*b* is arranged adjacent to radially outer sides of the pair of first axially extending portions 31*b*, respectively. The first axially extending portion 31*b* and the second axially extending portion 32*b* adjacent in the radial direction configure the axially extending portion 30*b* of the coil 30. That is, the axially extending portion 30*b* includes the first axially extending portion 31*b* provided on the first winding body 31 and the second axially extending portion 32*b* provided on the second winding body 32.

The contour shape of the second axially extending portion 32*b* in the cross section orthogonal to the axial direction is, for example, a fan shape in which the circumferential dimension decreases toward the radially inner side. More specifically, the contour shape of the second axially extending portion 32*b* in the cross section orthogonal to the axial direction is a shape surrounded by two arcs and two line segments, similarly to the axially extending portion 30*b* described above.

In the present example embodiment, the cross-sectional shape of the portion configuring the second axially extending portion 32*b* among the flat wires configuring the second winding body 32 is a trapezoidal shape in which the circumferential dimension decreases toward the radially inner side. More specifically, the cross-sectional shape of the portion configuring the second axially extending portion 32*b* among the flat wires configuring the second winding body 32 is a rounded trapezoidal shape in which the circumferential dimension decreases toward the radially inner side. In the following description, the portion configuring the second axially extending portion 32*b* among the flat wires configuring the second winding body 32 is referred to as a second coil wire portion 32*a*.

Each of the pair of second axially extending portions 32*b* is configured by bundling a plurality of second coil wire portions 32*a*. In the present example embodiment, each of the second axially extending portions 32*b* is configured by bundling eight second coil wire portions 32*a*. More specifically, in the present example embodiment, two rows of the second axially extending portions 32*b* are configured to be arranged in the radial direction, each row having four second coil wire portions 32*a* arranged in the circumferential direction. The circumferential dimension of the cross section of the second coil wire portion 32*a* configuring the radially outer row of the two rows aligned in the radial direction is larger than the circumferential dimension of the cross section of the second coil wire portion 32*a* configuring the radially inner row. The circumferential dimension of the cross section of the second coil wire portion 32*a* is smaller than the circumferential dimension of the cross section of the first coil wire portion 31*a*.

The radial dimension of the cross section of the second coil wire portion 32*a* configuring the radially outer row is smaller than the radial dimension of the cross section of the second coil wire portion 32*a* configuring the radially inner row. The radial dimension of the cross section of the second coil wire portion 32*a* is larger than the radial dimension of the cross section of the first coil wire portion 31*a*. The cross-sectional areas of the second coil wire portions 32*a* are the same.

As illustrated in FIG. 3, one end portion 31*c* connected to the second winding body 32 is obliquely drawn upward from one of the pair of first axially extending portions 31*b*. The one end portion 32*c* connected to the first winding body 31 is obliquely drawn upward from one of the pair of second axially extending portions 32*b*. The first axially extending portion 31*b* from which the one end portion 31*c* is drawn out and the second axially extending portion 32*b* from which the one end portion 32*c* is drawn out are located on opposite sides with the tooth 22 interposed therebetween in the circumferential direction.

Although not illustrated, the cross-sectional shape of a portion configuring a portion other than the first axially extending portion 31*b* in the flat wire configuring the first winding body 31 is, for example, a rounded square shape. The cross-sectional shape of a portion configuring a portion other than the second axially extending portion 32*b* in the flat wire configuring the second winding body 32 is, for example, a rounded square shape.

As illustrated in FIG. 2, the insulator 40 is, for example, a sheet-shaped insulating member. The insulators 40 may be an insulating tape or an insulating sheet of paper. In the present example embodiment, the insulator 40 is provided for each of the pair of axially extending portions 30*b*. The insulator 40 is wound around each of the pair of axially extending portions 30*b*. The insulator 40 provided on the axially extending portion 30*b* surrounds the axially extending portion 30*b* in a cross section orthogonal to the axial direction. Although not illustrated, the insulator 40 is provided over substantially the entire axially extending portion 30*b* in the axial direction.

Figure 4:
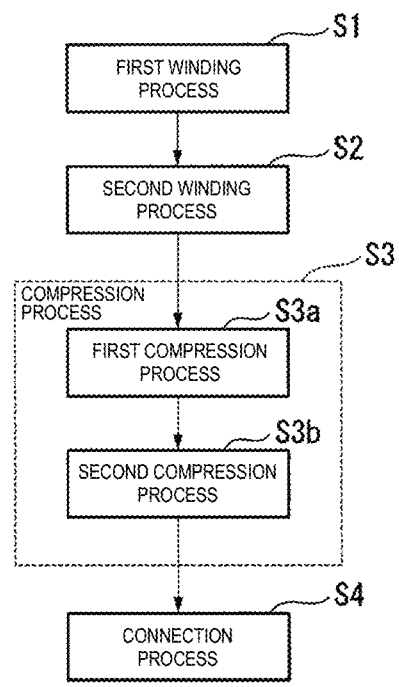
FIG. 4 is a flowchart illustrating a procedure in a method of manufacturing the coil of the first example embodiment.
Figure 5:
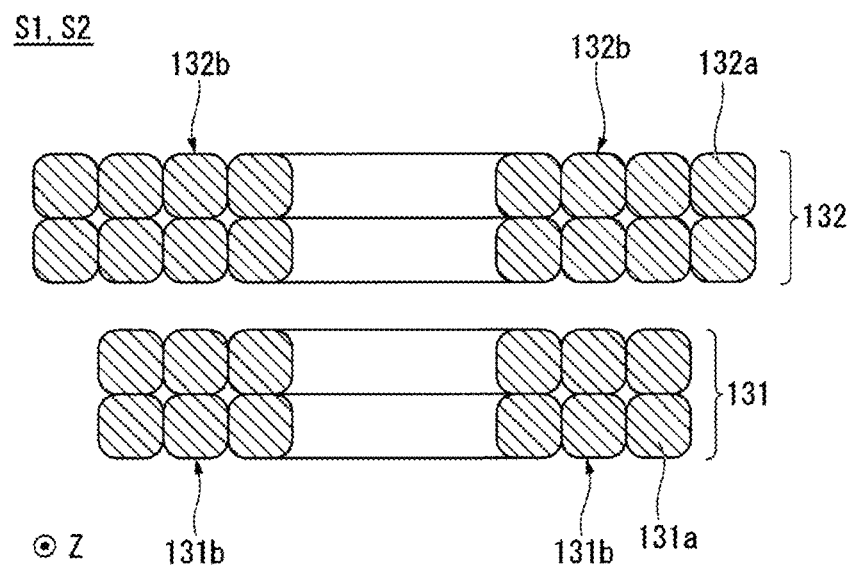
FIG. 5 is a cross-sectional view illustrating a portion of the procedure in the method of manufacturing the coil of the first example embodiment.

As illustrated in FIG. 4, a method of manufacturing the coil 30 includes a first winding process S1, a second winding process S2, a compression process S3, and a connection process S4. As illustrated in FIG. 5, the first winding process S1 is a process of winding a flat wire to form a first winding body 131. The second winding process S2 is a process of winding a flat wire to form a second winding body 132.

Either the first winding process S1 or the second winding process S2 may be performed first, or may be performed simultaneously.

The first winding body 131 is a winding body before becoming the first winding body 31 described above. In the first winding body 131, each cross-sectional shape of a plurality of first coil wire portions 131a configuring a first axially extending portion 131b is a rounded square shape. The contour shape of the first axially extending portion 131b in the cross section orthogonal to the axial direction is, for example, a substantially rectangular shape. The cross-sectional shape of the flat wire configuring the first winding body 131 is the same in any portion. The first winding body 131 is a three-layer winding body aligned and wound in two rows aligned in the radial direction.

The second winding body 132 is a winding body before becoming the second winding body 32 described above. In the second winding body 132, each cross-sectional shape of a plurality of second coil wire portions 132a configuring a second axially extending portion 132b is a rounded square shape. The contour shape of the second axially extending portion 132b in the cross section orthogonal to the axial direction is, for example, a substantially rectangular shape. The cross-sectional shape of the flat wire configuring the second winding body 132 is the same in any portion. The cross-sectional shape of the flat wire configuring the second winding body 132 is the same as the cross-sectional shape of the flat wire configuring the first winding body 131. The second winding body 132 is a four-layer winding body aligned and wound in two rows aligned in the radial direction.

Figure 6:
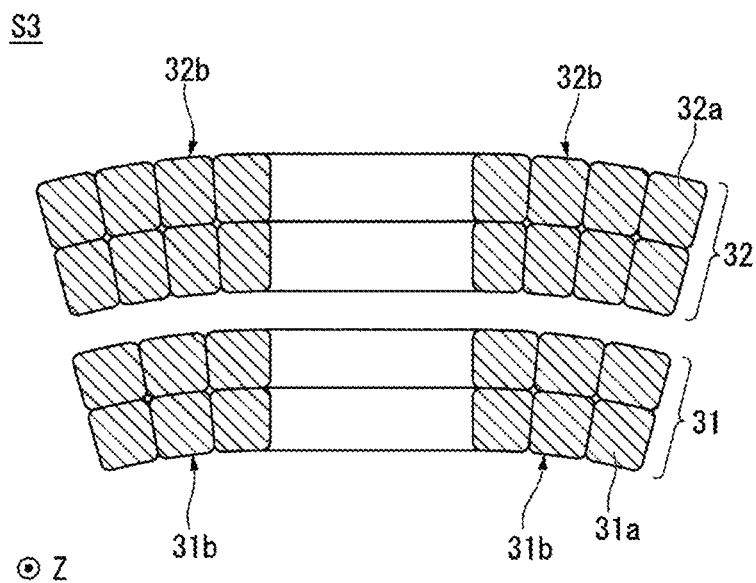
FIG. 6 is a cross-sectional view illustrating another part of the procedure in the method of manufacturing the coil of the first example embodiment.

As illustrated in FIG. 6, the compression process S3 is a process of compressing and deforming the first winding body 131 and the second winding body 132. As illustrated in FIG. 4, in the present example embodiment, the compression process S3 includes a first compression process S3a and a second compression process S3b. The first compression process S3a is a process of compressing and deforming the first winding body 131. The second compression process S3b is a process of compressing and deforming the second winding body 132. In the present example embodiment, the first compression process S3a and the second compression process S3b are provided before the connection process S4. Either the first compression process S3a or the second compression process S3b may be performed first, or may be performed simultaneously.

In the first compression process S3a of the present example embodiment, the contour shape of the first axially extending portion 131b in the cross section orthogonal to the axial direction is deformed into a fan shape in which the circumferential dimension decreases toward the radially inner side. Accordingly, the cross-sectional shape of the portion configuring the first axially extending portion 131b among the flat wires configuring the first winding body 131, that is, the cross-sectional shape of the first coil wire portion 131a is deformed into a trapezoidal shape in which the circumferential dimension decreases toward the radially inner side. By the first compression process S3a, the first axially extending portion 131b becomes the first axially extending portion 31b, and the above-described first winding body 31 is formed.

In the second compression process S3b of the present example embodiment, the contour shape of the second axially extending portion 132b in the cross section orthogonal to the axial direction is deformed into a fan shape in which the circumferential dimension decreases toward the radially inner side. Accordingly, the cross-sectional shape of the portion configuring the second axially extending portion 132b among the flat wires configuring the second winding body 132, that is, the cross-sectional shape of the second coil wire portion 132a is deformed into a trapezoidal shape in which the circumferential dimension decreases toward the radially inner side. By the second compression process S3b, the second axially extending portion 132b becomes the second axially extending portion 32b, and the above-described second winding body 32 is formed.

As described above, in the compression process S3, the contour shape of the first axially extending portion 131b in the cross section orthogonal to the axial direction is deformed into a fan shape in which the circumferential dimension decreases toward the radially inner side, and the contour shape of the second axially extending portion 132b in the cross section orthogonal to the central axis J is deformed into a fan shape in which the circumferential dimension decreases toward the radially inner side.

A method of compressing and deforming each winding body in first compression process S3a and second compression process S3b is not particularly limited. In the first compression process S3a and the second compression process S3b of the present example embodiment, each axially extending portion is subjected to press working by a mold surrounding each axially extending portion of each winding body, and each winding body is compressed and deformed.

The connection process S4 is a process of arranging the second winding body 32 on the radially outer side of the first winding body 31 to connect the first winding body 31 and the second winding body 32. In the connection process S4 of the present example embodiment, the one end portion 31c of the first winding body 31 and the one end portion 32c of the second winding body 32 are connected. As described above, a method of connecting the one end portion 31c and the one end portion 32c is not particularly limited. Through the above processes, the coil 30 is manufactured.

According to the present example embodiment, the coil 30 includes the first winding body 31 and the second winding body 32 connected to the first winding body 31. When N is a freely-selected integer of 1 or more, and M is a freely-selected integer larger than N, the first winding body 31 is an N-layer winding body aligned and wound in two rows aligned in the radial direction, and the second winding body 32 is an M-layer winding body aligned and wound in two rows aligned in the radial direction. In the case of aligning and winding flat wires in two rows, it is easy to align and wind the flat wires with high accuracy as compared with the case of aligning and winding the flat wires in three or more rows. Therefore, by connecting a plurality of winding bodies each aligned and wound in two rows, it is possible to easily manufacture the coil 30 in which flat wires are accurately aligned in four or more rows. Accordingly, the distortion of the shape of the coil 30 can be suppressed.

M is a freely-selected integer larger than N. Therefore, the number of layers of the second winding body 32 located on the radially outer side of the first winding body 31 is larger than the number of layers of the first winding body 31. Here, in a case where the motor 1 is an inner rotor type motor, an interval between the teeth 22 adjacent to each other in the circumferential direction increases toward the radially outer side. Therefore, by making the number of layers of the second winding bodies 32 located on the radially outer side of the first winding body 31 larger than the number of layers of the first winding body 31, more windings can be arranged between the teeth 22 with high space efficiency. Accordingly, the total number of windings of the coil 30 can be suitably increased.

For example, in a case where a multilayer wound coil is simply formed by aligning and winding flat wires, the total number of windings of the coil is the number obtained by multiplying the number of alignments by the number of layers. Therefore, for example, in a case where at least one of the number of alignments and the number of layers is limited, there is a possibility that the total number of windings of the coil that can be adopted is limited. On the other hand, according to the present example embodiment, since the number of layers of the first winding body 31 and the number of layers of the second winding body 32 are different from each other, it is easy to adjust the total number of windings of the coil 30 by adjusting the number of layers of each winding body. Therefore, the degree of freedom of the total number of windings of the coil 30 that can be adopted can be improved. In the present example embodiment, for example, the total number of windings of the coil 30 can be set to any even number of six or more.

According to the present example embodiment, the contour shape of the axially extending portion 30*b* in the cross section orthogonal to the axial direction is a fan shape in which the circumferential dimension decreases toward the radially inner side. Therefore, the coils 30 can be suitably filled and arranged between the teeth 22 adjacent to each other in the circumferential direction. Accordingly, it is easy to further improve the space factor of the coil 30.

For example, in a case where the contour shape of the axially extending portion is formed into the fan shape as described above in the conventional multilayer wound coil, the cross-sectional shape of the coil wire portion located on the radially inner side has a smaller circumferential dimension and a larger radial dimension. On the other hand, the cross-sectional shape of the coil wire portion located on the radially outer side has a larger circumferential dimension and a smaller radial dimension. Accordingly, the cross-sectional shape of at least some of the coil wire portions tends to be flat. In this case, the eddy current loss of the coil tends to increase. When a flat wire having a substantially square cross-sectional shape is deformed to have a flat cross-sectional shape, the deformation amount of the flat wire tends to increase. Therefore, when the flat wire is deformed, there is a possibility that the enamel coating provided on the surface is broken. In addition, the deformation of each coil wire portion configuring the axially extending portion tends to be non-uniform.

On the other hand, according to the present example embodiment, the number of layers of the second winding body 32 located on the radially outer side of the first winding body 31 is larger than the number of layers of the first winding body 31. Therefore, the number of layers of the second winding bodies 32 configuring the radially outer portion of the axially extending portion 30*b* can be relatively large, and the number of layers of the first winding bodies 31 configuring the radially inner portion of the axially extending portion 30*b* can be relatively small. Accordingly, even when the contour shape of the axially extending portion 30*b* is deformed into a fan shape, the deformation amount of each coil wire portion configuring the axially extending portion 30*b* can be reduced. Therefore, the cross-sectional shape of each coil wire portion can be suppressed from becoming flat. Therefore, it is possible to suppress an increase in eddy current loss of the coil 30. In addition, it is possible to suppress breakage of the enamel coating provided on the surface of the flat wire. In addition, it is possible to suppress the deformation of each coil wire portion configuring the axially extending portion 30*b* from becoming non-uniform.

For example, in a case where flat wires are simply aligned and wound to form a multilayer wound coil, in a certain number of layers or the like, the contour shape of the axially extending portion may be difficult to be compressed and deformed into a fan shape due to the increase in the deformation amount of the flat wires as described above. Therefore, in a case where the contour shape of the axially extending portion is formed in a fan shape, the number of layers and the like are likely to be limited, and there is a possibility that the total number of windings of the coil that can be adopted is limited. On the other hand, according to the present example embodiment, the contour shape of the axially extending portion can be formed into a fan shape while suppressing the deformation amount of each coil wire portion as described above. Therefore, it is possible to suppress the occurrence of limitation on the total number of windings of the coil 30 that can be adopted, and it is easy to adopt the desired total number of windings of the coil 30 within an even number range of six or more.

According to the present example embodiment, the first compression process S3*a* and the second compression process S3*b* are provided before the connection process S4. Therefore, it is possible to connect the first winding body 31 and the second winding body 32 after the first winding body 131 and the second winding body 132 are respectively deformed to form the first winding body 31 and the second winding body 32. Accordingly, each winding body can be easily compressed and deformed as compared with a case where the first winding body 131 and the second winding body 132 are collectively compressed and deformed after being bonded.

Figure 7:
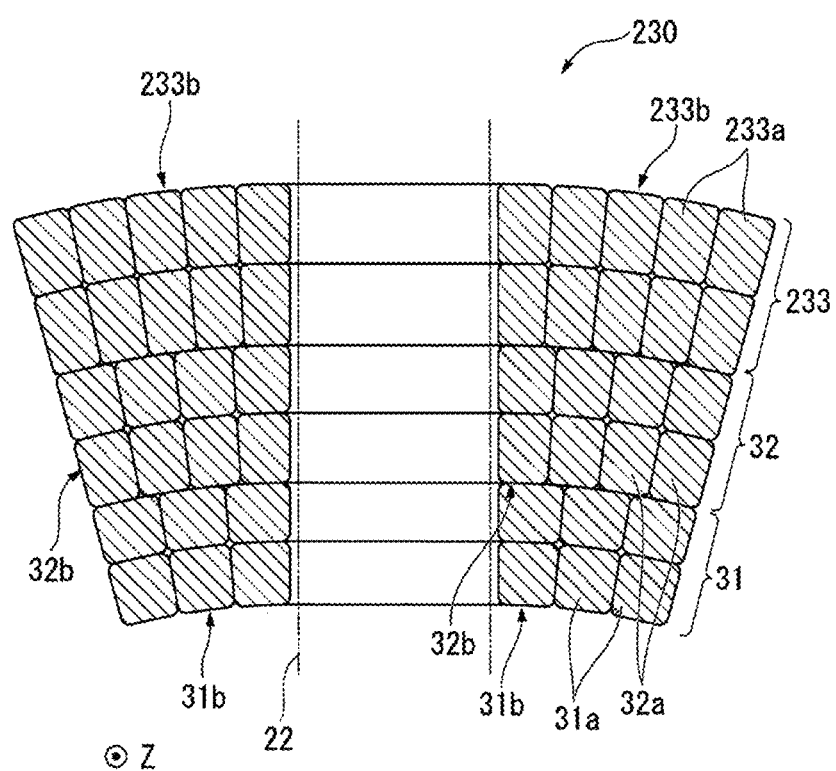
FIG. 7 is a cross-sectional view illustrating a coil of a second example embodiment of the present disclosure.

As illustrated in FIG. 7, the coil 230 of the present example embodiment further includes a third winding body 233. The third winding body 233 is configured by winding a flat wire. The third winding body 233 is located on the radially outer side of the second winding body 32. The third winding body 233 is connected to the second winding body 32. As a method of connecting second winding body 32 and third winding body 233, a method similar to the method of connecting first winding body 31 and second winding body 32 can be adopted.

In the following description, L is a freely-selected integer larger than M. At this time, the third winding body 233 is an L-layer winding body aligned and wound in two rows aligned in the radial direction. In the present example embodiment, the third winding body 233 is configured by stacking five layers of windings aligned and wound in two rows aligned in the radial direction. That is, in the present example embodiment, L is 5, and the third winding body 233 is a five-layer winding body aligned and wound in two rows aligned in the radial direction. Accordingly, the total number of windings of the third winding body 233 is 10.

The third winding body 233 has a pair of third axially extending portions 233*b* extending in the axial direction on both circumferential sides of the tooth 22 to which the third winding body 233 is attached. The pair of third axially extending portions 233*b* are arranged adjacent to the radially outer sides of the pair of second axially extending portions 32*b*. The contour shape of the third axially extending portion 233*b* in the cross section orthogonal to the axial direction is, for example, a fan shape in which the circumferential dimension decreases toward the radially inner side. More specifically, the contour shape of the third axially extending portion 233*b* in the cross section orthogonal to the axial direction is a shape surrounded by two arcs and two line segments, similarly to the axially extending portion 30*b* described above.

In the present example embodiment, the cross-sectional shape of the portion configuring the third axially extending portion 233*b* among the flat wires configuring the third winding body 233 is a trapezoidal shape in which the circumferential dimension decreases toward the radially inner side. More specifically, the cross-sectional shape of the portion configuring the third axially extending portion 233*b* among the flat wires configuring the third winding body 233 is a rounded trapezoidal shape in which the circumferential dimension decreases toward the radially inner side. In the following description, the portion configuring the third axially extending portion 233*b* among the flat wires configuring the third winding body 233 is referred to as a third coil wire portion 233*a*.

Each of the pair of third axially extending portions 233*b* is configured by bundling a plurality of third coil wire portions 233*a*. In the present example embodiment, each of the third axially extending portions 233*b* is configured by bundling ten third coil wire portions 233*a*. More specifically, in the present example embodiment, two rows of the third axially extending portions 233*b* are configured to be arranged in the radial direction, each row having five third coil wire portions 233*a* arranged in the circumferential direction. The circumferential dimension of the cross section of the third coil wire portion 233*a* configuring the radially outer row of the two rows aligned in the radial direction is larger than the circumferential dimension of the cross section of the third coil wire portion 233*a* configuring the radially inner row. The circumferential dimension of the cross section of the third coil wire portion 233*a* is smaller than the circumferential dimension of the cross section of the second coil wire portion 32*a*.

The radial dimension of the cross section of the third coil wire portion 233*a* configuring the radially outer row is smaller than the radial dimension of the cross section of the third coil wire portion 233*a* configuring the radially inner row. The radial dimension of the cross section of the third coil wire portion 233*a* is larger than the radial dimension of the cross section of the second coil wire portion 32*a*. The cross-sectional areas of the third coil wire portions 233*a* are the same.

Although not illustrated, the cross-sectional shape of a portion configuring a portion other than the third axially extending portion 233*b* in the flat wire configuring the third winding body 233 is, for example, a rounded square shape. The other configuration of the coil 230 is similar to the other configuration of the coil 30 of the first example embodiment.

According to the present example embodiment, since the coil 230 is configured by three winding bodies, it is possible to increase the total number of windings of the coil 230 while suppressing the distortion of the shape of the coil 230 by accurately aligning the windings.

The present disclosure is not limited to the above-described example embodiment, and another configuration may be adopted within the scope of the technical idea of the present disclosure. N is not particularly limited as long as it is an integer of 1 or more. M is not particularly limited as long as it is an integer larger than N. L is not particularly limited as long as it is an integer larger than M. For example, N may be 1, M may be 2, and L may be 3. That is, the first winding body may be a single-layer winding body, the second winding body may be a two-layer winding body, and the third winding body may be a three-layer winding body. In addition, M may be greater than N by 2 or more, and L may be greater than M by 2 or more. N, M, and L are preferably, for example, 10 or less. This is because it is easy to wind the flat wire to form each winding body, and it is easy to compress and deform each winding body. In addition, M is preferably, for example, three times or less of N. In this way, when the second winding body is compressed and deformed, the cross-sectional shape of the coil wire portion configuring the second axially extending portion can be suppressed from becoming flatter. The contour shape of the axially extending portion in the cross section orthogonal to the axial direction may not be a fan shape. The cross-sectional shape of the coil wire portion configuring the axially extending portion may not be a trapezoidal shape.

The process of compressing and deforming the first winding body and the process of compressing and deforming the second winding body may be provided after the process of connecting the first winding body and the second winding body. The processes of compressing and deforming the first winding body and the second winding body may not be provided.

The motor to which the coil of the present disclosure is applied is not particularly limited. The motor to which the coil of the present disclosure is applied may be an outer rotor type motor. In this case, the radially outer side corresponds to one radial side, and the radially inner side corresponds to another radial side. The configurations described above in the present description may be appropriately combined in a range where no conflict arises.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A coil attachable to a tooth extending to one radial side of the tooth from an annular core back surrounding a central axis of a motor, the coil comprising:
   a first winding body including a first wound flat wire;
   a second winding body including a second wound flat wire, that is located on a radial side of the first winding body, and that is connected to the first winding body;
   a pair of first axially extending portions extending in an axial direction of the central axis on two circumferential sides of the tooth to which the first winding body is attached; and
   a pair of second axially extending portions extending in the axial direction of the central axis on two circumferential sides of the tooth to which the second winding body is attached; wherein
   when N is a freely-selected integer of 1 or more, and M is a freely-selected integer larger than N:
      the first winding body is an N-layer winding body aligned and wound in two rows aligned in a radial direction; and
      the second winding body is an M-layer winding body aligned and wound in two rows aligned in the radial direction;
   the pair of second axially extending portions is respectively arranged adjacent to radially outer sides of the pair of first axially extending portions;
   a contour shape of the first axially extending portions and the second axially extending portions in a cross section orthogonal to the axial direction of the central axis is a fan shape in which a circumferential dimension decreases toward the one radial side; and the circumferential dimension of the cross section of a portion defining the second axially extending portions is smaller than the circumferential dimension of the cross section of a portion defining the first axially extending portions.

2. The coil according to claim 1, further comprising:
a third winding body including a third wound flat wire, that is located on a radial side of the second winding body, and that is connected to the second winding body; wherein
when L is a freely-selected integer larger than M, the third winding body is an L-layer winding body aligned and wound in two rows aligned in the radial direction.

3. A motor comprising:
a rotor that is rotatable about a central axis; and
a stator that opposes the rotor in a radial direction with a gap interposed therebetween; wherein
the stator includes:
an annular core back that surrounds the central axis;
a tooth that extends from the core back to one radial side; and
the coil according to claim 1 that is attached to the tooth.

4. The coil according to claim 1, further comprising:
a radial dimension of the cross section of the portion defining the second axially extending portion is larger than a radial dimension of the cross section of the portion defining the first axially extending portion.

5. A stator having coils attached to a tooth extending to one radial side of the tooth from an annular core back surrounding a central axis of a motor, the stator comprising:
a stator core including the coils extending to the one radial side of the tooth from the annular core back; and
a first winding body including a first wound flat wire;
a second winding body including a second wound flat wire, that is located on a radial side of the first winding body, and that is connected to the first winding body;
a pair of first axially extending portions extending in an axial direction of the central axis on two circumferential sides of the tooth to which the first winding body is attached; and
a pair of second axially extending portions extending in the axial direction of the central axis on two circumferential sides of the tooth to which the second winding body is attached; wherein
when N is a freely-selected integer of 1 or more, and M is a freely-selected integer larger than N:
the first winding body is an N-layer winding body aligned and wound in two rows aligned in a radial direction; and
the second winding body is an M-layer winding body aligned and wound in two rows aligned in the radial direction;
the pair of second axially extending portions is respectively arranged adjacent to radially outer sides of the pair of first axially extending portions;
a contour shape of the first axially extending portions and the second axially extending portions in a cross section orthogonal to the axial direction of the central axis is a fan shape in which a circumferential dimension decreases toward the one radial side; and
the circumferential dimension of the cross section of a portion defining the second axially extending portions is smaller than the circumferential dimension of the cross section of a portion defining the first axially extending portions.

6. The stator according to claim 5, further comprising:
a third winding body including a third wound flat wire, that is located on a radial side of the second winding body, and that is connected to the second winding body; wherein
when L is a freely-selected integer larger than M, the third winding body is an L-layer winding body aligned and wound in two rows aligned in the radial direction.

7. The stator according to claim 5, wherein
a radial dimension of the cross section of the portion defining the second axially extending portion is larger than a radial dimension of the cross section of the portion defining the first axially extending portion.

8. The stator according to claim 5, wherein
a radially outer end of the tooth is fixed to a radially inner surface of the core back.

9. The stator according to claim 5, wherein
a radially inner end portion of the tooth includes an umbrella portion protruding to two circumferential sides.

* * * * *